Patented Sept. 4, 1945

2,384,125

UNITED STATES PATENT OFFICE 2,384,125

UNSATURATED ESTERS AND POLYMERS THEREOF

Irving E. Muskat, Akron, and Franklin Strain, Norton Center, Ohio, assignors to Pittsburgh Plate Glass Company, Pittsburgh, Pa., a corporation of Pennsylvania No Drawing. Application March 7, 1942, Serial No. 433,833

6 Claims. (Cl. 260—78)

This invention relates to a new class of unsaturated esters having valuable uses as herein described. The new compounds are polyesters of (a) polypropylene glycol and (b) a half ester of carbonic acid and an unsaturated alcohol. The invention is especially related to esters of di-, 1,2-propylene glycol, otherwise known as dipropylene glycol.

The new compounds are esters of unsaturated alcohols, preferably those which contain three to five carbon atoms and an unsaturated linkage in an aliphatic chain, such as allyl, methallyl, 2-ethylallyl, crotyl, isocrotyl, tiglyl, angelyl, isopropenyl alcohols, methyl vinyl carbinol, propargyl alcohol, 2-chlorallyl alcohol, butadienyl, divinyl carbinol, chlorocrotyl alcohol, dimethyl vinyl carbinol, methyl propargyl alcohol, etc.

Although the lower alcohol esters are preferred, the esters of unsaturated alcohols containing six to ten carbon atoms, for example, geraniol, linalool, cinnamyl, phenyl-propargyl alcohol, 1-hydroxy hexadiene-2,4, propylallyl alcohol, n-octenol, chlorocinnamyl alcohol, etc., may be used.

The new unsaturated esters have the structure:

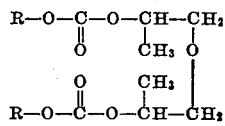

in which R is the radical of an unsaturated alcohol.

The new esters may be prepared by treating the dipropylene glycol with phosgene at temperatures between 0° C. and 20° C. by bubbling the gas through the glycol in a reaction flask submerged in a cooling medium such as ice-salt or dry-ice-acetone mixtures. The resulting dichloroformate of dipropylene glycol is then reacted with an unsaturated alcohol in the presence of pyridine or other cyclic tertiary amine or a carbonate, oxide, or hydroxide of an alkaline or alkaline earth metal. The same esters may alternatively be prepared by reacting phosgene with the unsaturated alcohol and subsequently reacting the resulting chloroformate with dipropylene glycol.

Although the chloroformate and the hydroxy compounds are preferably reacted at subnormal temperatures, higher temperatures may be used, especially when insoluble alkaline reagents are used, for example, CaCO₃. The reactions are preferably conducted in liquid phase with a stirring device to insure homogeneous mixture of reagents and uniform reaction conditions. When either the ester or an intermediate product is a solid at the reaction temperature, it may be desirable to conduct the reaction in the presence of a solvent or diluent such as benzene, xylene, acetone, chloroform or carbon tetrachloride.

The new unsaturated carbonates are generally non-resinous compounds having distinct boiling and melting points and are often capable of separation in substantially pure state. Frequently the impurities are side reaction products which are colorless and transparent esters having characteristics similar to the esters herein contemplated. In some cases removal of the impurities may be unnecessary where they do not produce any detrimental effect in the use of the ester. The new compounds are usually liquids at room temperature but some, however, are solids. The new unsaturated compounds are usually miscible with solvents such as benzene, toluene, chloroform, diethyl ether, carbon tetrachloride, and petroleum ether. The monomeric esters are valuable as plasticizers for various resin materials such as styrene, cellulose, vinyl, urea, protein, phenolic, or acrylic resins. Other uses such as solvents, insecticides, and liquid coating compositions are noteworthy.

These esters may be polymerized in the presence of heat, light, or catalysts such as oxygen, ozone, or organic peroxides such as lauroyl, benzoyl, and acetone peroxides, to yield solid or liquid compositions of widely differing physical properties. The polymerized products vary in properties depending upon the structure of the ester and upon the degree of polymerization.

The polyunsaturated esters contain at least two radicals derived from unsaturated alcohol and are capable of polymerization to a fusible intermediate stage and finally to a substantially infusible and/or insoluble form. The completely polymerized polyunsaturated compounds are, in general, substantially unaffected by acid, alkalies, water, and organic solvents. Intermediate polymers derived from the polyunsaturated esters having a wide range of properties may be secured by incomplete polymerization. The polymers thus obtained are transparent and colorless, although they may at times have a slightly yellow cast, especially when polymerized completely. Many of these new polymers are generally tougher and more resistant to shattering than are the unsaturated alcohol esters of polybasic acids.

Upon the initial polymerization of the polyunsaturated esters in liquid monomeric state or in a solution of the monomer in suitable solvents, an increase in the viscosity of the liquids is noticeable due to the formation of a simple polymer which is soluble in the monomer and in solvents such as acetone, benzene, xylene, dioxane, toluene, or carbon tetrachloride. Upon further polymerization, the liquid sets up to form a soft gel containing a substantial portion of a polymer which is insoluble in the monomer and organic solvents and containing as well, a substantial portion of a soluble material which may be monomer and/or soluble fusible polymer. These gels are soft and bend readily. However, they are fragile and crumble or tear under low stresses. They may be further polymerized in the presence of catalysts to the final infusible insoluble state in which substantially all of the polymer is substantially infusible and substantially insoluble in organic solvents, acids, and alkalies.

The monomers of the polyunsaturated esters may be cast polymerized directly to the substantially insoluble, infusible state. This procedure is subject to certain inherent difficulties due to the strains which are established during polymerization of the gel and which frequently result in fractures as the final hard form is attained. It has been discovered that these difficulties may be avoided by releasing the strains established in the gel before the fracturing can occur. This may be done by permitting the strains to be relieved before the polymerization is complete, either periodically or by conducting the polymerization under conditions which permit gradual release of these strains. For example, the polymerization may be conducted in a simple mold until a soft firm gel has formed. At this point the polymer may be freed from the mold to which it adheres strongly. When released the polymer contracts substantially, thereby relieving the polymerization strains. The gel may thereafter be shaped, if desired, and polymerized to the final infusible state. Smooth, optically perfect sheets may be made by this method. Preferably, the initial polymerization is conducted at a temperature sufficiently low to prevent the complete decomposition of the peroxide catalyst. This temperature is dependent upon the catalyst used. For benzoyl peroxide, temperatures of 65 to 80° C. are suitable, while for acetone peroxide, temperatures of 140–145° C. may be used. In accordance with one modification, the gel, after it is free from the mold, may be coated on both sides with monomer or the syrupy polymer. The coated article is then polymerized between smooth heated plates to the final insoluble state.

In order to inhibit formation of cracks during the initial polymerization, it is frequently desirable to minimize the polymerization on one side of the sheet. This is done by conducting the polymerization with one side exposed to the air which inhibits polymerization in the presence of a peroxide catalyst, such as benzoyl peroxide. Thus, a sheet is produced which is hard and smooth on one side while being soft and tacky on the other. The sheet may then be finished by coating the tacky side with monomer or syrupy polymer and polymerizing it in contact with a smooth plate to the insoluble, infusible state. Often, it is found desirable to release the polymer from the plate one or more times during polymerization of the coating in order to minimize the formation of cracks or other surface defects.

Cast polymers may also be prepared by a single step polymerization directly to the insoluble infusible state. The monomer may be mixed with one to five percent of benzoyl or other organic peroxide and heated at 50–60° C. until it becomes partly polymerized and thickened to an increased viscosity of 100 to 1000 percent of the monomer viscosity. The thickened monomer may then be polymerized between glass, metal, or similar plates which are separated by compressible gaskets or retainers of Koroseal (plasticized polyvinylchloride), butadiene polymers, polyvinyl alcohol, Thiokol (polyethylene sulfide), rubber, or similar materials arranged about the edge of such plates. The thickened monomer may be poured on one glass plate within the confines of the flexible retainer, laid about 2 inches from the edge of the plate. The second glass plate then may be carefully laid on top, taking care to avoid the trapping of air bubbles under the top plate. When the top plate is in position, both plates may be held together by means of suitable clamps which are capable of applying pressure upon the plates and are placed directly over the flexible retainer. The entire assembly is then placed in an oven and heated at 70 to 100° C. where the polymerization is continued. During the polymerization the resin shrinks and tends to draw away from the glass surfaces. To prevent fractures pressure is maintained upon the plates to depress the flexible retainer and permit the plates to remain in contact with the polymerizing resin. This pressure may be maintained by periodically tightening the clamps or by use of spring clamps which maintain a uniform pressure throughout the polymerization process.

By an alternative procedure for cast polymerizing sheets, the molds may be assembled before the thickened monomer is poured. Thus, the flexible compressible retainer may be inserted between the plates and held in place by suitable clamps located around the edge of the plates. This retainer or gasket is placed adjacent the edge of the plates and a suitable opening may be provided between the ends of the flexible retainer, preferably at one corner of the mold. The assembled mold is then placed in a vertical position with the open corner uppermost. The thickened monomer containing one to four percent residual peroxide is then poured in slowly until the entire mold is filled. After standing until all of the entrapped air has separated the mold is heated uniformly between 70 and 100° C. to continue the polymerization. Pressure is maintained upon the plates to insure the contact of glass and resin during polymerization by suitable means such as by tightening the clamps periodically or by maintaining a uniform pressure upon the plates throughout by means of spring clamps. When the resin has been completely polymerized it is separated from the glass plates and a hard, transparent, colorless and durable resin sheet is obtained.

Other methods have been developed for polymerization of the compounds herein contemplated while avoiding formation of cracks and fractures. By one of these methods the polymerization may be suspended while the monomer-polymer mixture is in the liquid state and before the polymer is converted to a gel by cooling, by removal from exposure to ultraviolet light, by adding inhibiting materials such as pyrogallol, hydroquinone, aniline, phenylene diamine, or sulphur, or by destruction of the polymerization catalyst. The fusible polymer may be separated from all or part of the monomer by any of several methods. It may be precipitated by the addition of nonsolvents for the fusible polymer such as water, ethyl alcohol, methyl alcohol, or glycol. Alternatively, it may also be separated from the monomer by distillation in the presence of an inhibitor for polymerization and preferably at reduced pressures. The fusible polymer is thus obtained in stable solid form and as such may be used as a molding powder or may be redissolved in suitable solvent for use in liquid form. It is soluble in organic solvents which are normally capable of dissolving methyl methacrylate polymer or similar vinyl type polymer. Preferably, the new polymers of the polyunsaturated esters are produced by heating the monomer or a solution thereof in the presence of substantial quantities, for example, 2 to 5 percent of benzoyl peroxide until the viscosity of the solution has increased about 100 to 500 percent. This may require from one-half to two hours while heating at 65 to 85° C. in the presence of benzoyl peroxide. The resulting viscous solution is poured into an equal volume of water, methyl or ethyl alcohols, glycol, or other nonsolvent for the fusible polymer. A polymer, usually in the form of a powder or a gummy precipitate, is thus formed which may be filtered and dried. This permits substantially complete separation of a soluble fusible polymer from unpolymerized monomer.

Often, however, such complete separation is not desirable since hazy products may be secured upon further polymerization. Accordingly, it is often desirable to produce compositions comprising the fusible polymer and the monomer. This may be effected by partial distillation or extraction of monomer from the polymer or by reblending a portion of the fusible polymer with the same or a different polymerizable monomer. In general, the composition should contain at least 40 percent and preferably in excess of 50 percent fusible polymer and from about 5 percent to 50 or 60 percent monomer.

Preferably, the production of these materials is conducted by treatment of a solution of the monomer in a solvent for monomer and polymer such as benzene, xylene, toluene, carbon tetrachloride, acetone, or othe solvent which normally dissolves vinyl polymers.

Other polymerization methods may involve the interruption of the polymerization while the polymer is a gel. For example, a soft solid gel containing a substantial portion of fusible polymer may be digested with a quantity of solvent for the fusible polymer to extract the fusible gel from the infusible. The solution may then be treated as above described to separate the fusible polymer from the solvent. These polymers may be used as molding or coating compositions. Due to their solubility, they are particularly desirable for use in paint compositions.

Other fusible polymers may be prepared by carrying the initial polymerization to the point where the polymer is in the form of a gel which generally contains at least 20 percent and preferably about 45 to 80 percent by weight of substantially insoluble polymer, but at which point the gel is still fusible. This solid resin composition may be disintegrated to a pulverulent form and used as a molding powder. Alternatively, a desirable polymer may be prepared by emulsifying the monomer or a syrupy polymer in an aqueous medium with or without a suitable emulsification agents such as polyvinyl alcohol, polyallyl alcohol, etc., and then polymerizing to the point where the gel precipitates. This polymer may be separated and used as molding powder.

The solid forms of the fusible polymers may be used as molding compositions to form desirable molded products which may be polymerized to a thermohardened state. Preferably, the molding is conducted in a manner such that the polymer fuses or blends together to form a substantially homogeneous product before the composition is polymerized to a substantially infusible state. This may be effected by conducting polymerization at an elevated temperature and/or pressure in the presence of benzoyl peroxide, generally in a heated mold. The polymers may be mixed with fillers such as alpha cellulose, wood pulp, and other fibrous substances, mineral fillers, or pigments such as zinc oxide, calcium carbonate, lead chromate, magnesium carbonate, calcium silicate, etc. and plasticizers such as the saturated alcohol esters of phthalic acid, camphor, the saturated alcohol esters of maleic, fumaric, succinic, and adipic acids, or di- or triethylene glycol bis (butyl carbonate). The polymeric molding powder may be copolymerized with phenolic, cellulose acetate, urea, vinylic, protein, or acrylic resins. It is thus possible to produce transparent or opaque forms of a wide variety of colors and hardnesses, depending upon the proper selection of the modifying agents.

The fusible polymers may be dissolved in suitable solvents, and used as coating and impregnating compositions. For example, the solution or dispersion of fusible polymer in monomer or other organic solvent such as benzene, toluene, chloroform, acetone, dioxane, carbon tetrachloride, phenyl Cellosolve, dichlorethyl ether, dibutyl phthalate, or mixtures thereof, is useful as a liquid coating composition. Objects of paper, metal, cloth, wood, leather, or synthetic resins may be coated with the solution of polymer in solvent and subsequently polymerized to yield attractively finished coatings. Similarly, porous objects of felt, cloth, leather, paper, etc., either in single layers or laminated, may be impregnated with the dissolved fusible polymer and subjected to the polymerization to the final insoluble infusible state. Other molding powders may be prepared from the new esters without first converting them to the intermediate polymer. The monomer may be mixed directly with a suitable filler such as magnesium carbonate, cellulose pulp, asbestos, etc., in a ball mill or other mixing device. By proper selection of proportions a dry pulverulent powder can be obtained which is capable of polymerization under the influence of heat and pressure to a glossy solid polymer of high tensile strength. The use of too much filler will cause a non-glossy finish and the use of too much monomer will make the powder moist and difficult to handle. Sometimes, it may be desirable to precure the molding powder by subjecting it to a moderate temperature 50 to 70° C. for a limited period of time, for example, one to three hours. This precuring operation is a partial polymerization and permits a dry molding powder where the same proportions of monomer might result in a moist molding composition.

Further details of the synthesis of these new esters and of their applications will be apparent from the following examples.

*Example I*

Two moles of dipropylene glycol was mixed with 1500 cc. benzene and cooled to 0° C. in a 3-liter flask. Gaseous phosgene was bubbled in at a rate of 100 millimoles per minute for 45 minutes. The resulting benzene solution was evacuated to evolve the unreacted phosgene and washed with water and dilute hydrochloric acid. The benzene was separated from the acid-chloride by vacuum distillation.

In a separate reaction vessel 250 grams of allyl alcohol, 350 grams of pyridine and 1000 cc. of benzene were mixed and cooled to 0° C. While the mixture was being stirred vigorously, the dichloroformate was added dropwise at a rate slow enough to maintain the temperature below +5° C. at all times. When the reaction was completed, the ester was washed with dilute sodium carbonate and water and distilled in vacuo to remove volatile impurities. The ester is a liquid believed to have the structure:

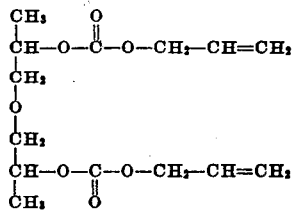

*Example II*

A mixture of 275 grams of dipropylene glycol and 250 cc. of 50 percent sodium hydroxide solution were mixed and cooled to 0° C. While stirring the mixture was added to 300 grams of methallyl chloroformate at the rate of 5 grams per minute for one hour. During the entire reaction the temperature did not rise above 11° C. The ester was washed with Na₂CO₃ and water and distilled at 2 mm. total pressure to remove volatile impurities. The ester is a liquid believed to have the structure:

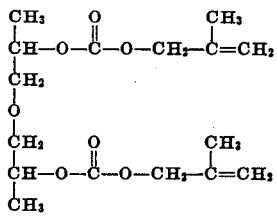

*Example III*

A quantity of 135 grams of dipropylene glycol was mixed with 200 grams of pyridine and 1000 cc. of benzene and cooled to +2° C. on an ice bath. The mixture was stirred vigorously while 310 grams of chlorallyl chloroformate (made by reaction of phosgene on chlorallyl alcohol) were added slowly enough to permit the dissipation of the heat of reaction. The temperature was permitted to rise above +10° C. When the reaction was completed the benzene solution was washed with dilute HCl and with water until neutral to phenolphthalein. The benzene and other volatile impurities were removed by heating in a vacuum. The ester has the structure:

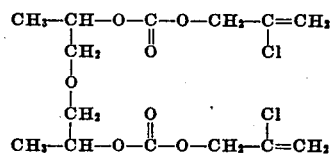

*Example IV*

A 200 cc. sample of dipropylene glycol bis (allyl carbonate) was mixed with 200 cc. of benzene and 1 percent acetyl peroxide until the viscosity had increased 500 percent. The benzene solution was then poured into 500 cc. of methyl alcohol. Immediately, a voluminous precipitate was formed. The precipitate was decanted and washed thoroughly with water. After drying, a colorless granular solid was obtained.

A ten-gram sample was mixed with 2 percent of acetyl peroxide and pressed in a mold at 2000 pounds per square inch at 135° C. A hard, brittle polymer which was transparent and nearly colorless was obtained.

*Example V*

A sample of 40 grams of finely divided magnesium carbonate was mixed with 65 grams of dipropylene glycol bis (methallyl carbonate) and 4 percent acetyl peroxide. After thoroughly mixing, the moist mass was heated at 60° C. for about 3 hours. The resultant partially polymerized mass was pulverized and screened.

Twenty grams was pressed in a mold at 150° C. and 1500 pounds per square inch pressure for one hour. A white, opaque molding of uniform high gloss was obtained.

*Example VI*

A mold was made of two square glass plates (14" x 14") and a soft Thiokol resin strip (½" x ¼" x 46") by placing the flexible strip between the two glass plates and about one to two inches in from the edges. The ends of the strip were about 2 inches apart at one corner. The mold was held together by C clamps located about 2 inches apart and with the pressure exerted directly across the flexible gasket. The mold was mounted in a vertical position with the open corner uppermost.

About 300 cc. of the ester prepared in Example I was thickened by heating at 60° C. with 5 percent benzoyl peroxide for about 2 hours. The viscous liquid so procured which still contained about 4 percent unreacted peroxide was poured into the mold slowly to avoid the entrapment of air bubbles. The mold was then placed in a 90° C. oven for 2 hours. At this time the gel had set but was very soft. The C clamps which had loosened due to the shrinkage of the gel were tightened to their former tension. At the end of six and ten hours the clamps were again tightened. At twelve hours the resin was removed from the mold and discovered to be a hard, clear sheet, almost colorless, and with a slight flexibility.

Although the invention has been described with respect to certain specific examples, it is not intended that details of same shall be limitations except as to the extent incorporated in the following claims.

This application is a continuation-in-part of Serial No. 361,280, filed October 15, 1940, and Serial No. 403,703, filed July 23, 1941, by Irving E. Muskat and Franklin Strain.

We claim:

1. Dipropylene glycol bis (allyl carbonate).
2. Dipropylene glycol bis (methallyl carbonate).
3. The polymer of the ester described in claim 1.
4. The polymer of the ester described in claim 2.
5. As a new compound a dipropylene glycol bis (alkenyl carbonate) wherein the alkenyl radical contains an olefinic bond in an aliphatic chain between the second and third carbon atoms from the carbonate radical.
6. A polymer of the compound defined by claim 5.

IRVING E. MUSKAT.
FRANKLIN STRAIN.